United States Patent [19]

Zuerner et al.

[11] Patent Number: 5,464,556

[45] Date of Patent: * Nov. 7, 1995

[54] COMPOSITION FOR THE PAINT SPRAY TREATMENT USING SECONDARY ALCOHOL ESTERS IN WATER

[75] Inventors: Edwin C. Zuerner, Troy; Robert R. Ratzelt; Norman Foster, both of Bloomfield Hills, all of Mich.

[73] Assignee: Nortru, Inc., Detroit, Mich.

[ * ] Notice: The portion of the term of this patent subsequent to Mar. 30, 2010, has been disclaimed.

[21] Appl. No.: 130,106

[22] Filed: Sep. 30, 1993

Related U.S. Application Data

[63] Continuation-in-part of Ser. No. 38,011, Mar. 29, 1993, Pat. No. 5,397,496, which is a continuation-in-part of Ser. No. 861,091, Mar. 31, 1992, Pat. No. 5,198,143, which is a continuation-in-part of Ser. No. 790,650, Nov. 8, 1991, Pat. No. 5,200,104.

[51] Int. Cl.$^6$ ..................................................... C11D 7/50
[52] U.S. Cl. ........................... 252/170; 252/546; 252/547; 252/DIG. 8
[58] Field of Search ..................................... 252/170, 546, 252/547, DIG. 8

[56] References Cited

U.S. PATENT DOCUMENTS

| | | |
|---|---|---|
| 4,130,674 | 12/1978 | Roberts et al. . |
| 4,265,944 | 5/1981 | Garner . |
| 4,276,064 | 6/1981 | Gerdes . |
| 4,289,505 | 9/1981 | Hardison et al. . |
| 4,295,845 | 10/1981 | Sepulveda et al. . |
| 4,339,248 | 7/1982 | Garner . |
| 4,378,235 | 3/1983 | Cosper et al. . |
| 4,396,405 | 8/1983 | Lindenberger et al. . |
| 4,444,573 | 4/1984 | Cosper et al. . |
| 4,504,395 | 3/1985 | Harpel et al. . |
| 4,523,932 | 6/1985 | Cosper et al. . |
| 4,554,026 | 11/1985 | Cosper et al. . |
| 4,563,199 | 1/1986 | Lindenberger et al. . |
| 4,750,919 | 6/1988 | Patzelt et al. . |
| 4,769,172 | 9/1988 | Siklosi . |
| 4,780,235 | 10/1988 | Jackson . |
| 4,781,916 | 11/1988 | Papaphilippov . |
| 4,812,255 | 3/1989 | Suwala . |
| 4,814,092 | 3/1989 | Patzelt . |
| 4,854,947 | 8/1989 | Patzelt . |
| 4,919,691 | 4/1990 | Patzelt et al. . |
| 4,927,556 | 5/1990 | Pokorny . |
| 4,941,491 | 7/1990 | Goerss et al. . |
| 4,948,513 | 8/1990 | Mitchell . |
| 4,956,115 | 9/1990 | Van De Mark . |
| 5,019,138 | 5/1991 | Farrah et al. . |
| 5,076,939 | 12/1991 | Hunter et al. . |
| 5,084,200 | 1/1992 | Dishart et al. . |
| 5,098,450 | 3/1992 | Patzelt et al. . |
| 5,198,143 | 3/1993 | Zuerner et al. .......................... 252/170 |
| 5,200,104 | 4/1993 | Zuerner et al. .......................... 252/170 |

OTHER PUBLICATIONS

March, Advanced Organic Chemistry, 1968, p. 349.
Eastman Chemicals Product Brochure for Texanol, Publication No. M158H, May, 1990.
Eastman Chemical Products, Inc. Material Safety Data Sheet "Texanol" Ester–Alcohol, May 19, 1989.
Eastman Chemical Products, Inc. Material Safety Data Sheet "Kodaflex" TXIB Plasticizer, Aug. 3, 1990.

*Primary Examiner*—Anthony McFarlane
*Assistant Examiner*—E. D. Irzinski
*Attorney, Agent, or Firm*—Basile and Hanlon

[57] ABSTRACT

A composition for treating oversprayed paints that contains an effective amount of alcohol esters and alcohol ester derivatives in water. The carbonyl compound is capable of dissolving paint while remaining non-reactive with water. The alcohol ester employed has the general formula:

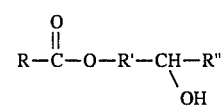

The alcohol ester derivative employed has the general formula:

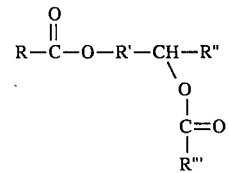

R' and R" are a substituted or unsubstituted linear alkyl group containing 1 to 8 carbon atoms, R and R'" are linear or branched alkyl groups containing 1 to 10 carbon atoms, and R and R'" are either identical or different alkyl functionalities.

14 Claims, No Drawings

COMPOSITION FOR THE PAINT SPRAY TREATMENT USING SECONDARY ALCOHOL ESTERS IN WATER

CROSS REFERENCE TO RELATED APPLICATIONS

The present application is a continuation-in-part of Ser. No. 08/038,011 filed on Mar. 29, 1993, now U.S. Pat No. 5,397,496, which is a continuation-in-part of Ser. No. 07/861,091 filed on Mar. 31, 1992, now U.S. Pat. No. 5,198,143 which itself is a continuation-in-part of Ser. No. 07/790,650 filed on Nov. 8, 1991, now U.S. Pat. No. 5,200,104.

BACKGROUND OF THE INVENTION

1. Field of the Invention

This invention pertains to compositions suitable for the treatment, removal and/or containment of paint overspray, paint particles, and/or the various nonvolatile components of paints, lacquers, enamels and the like. More specifically, this invention relates to compositions containing organic materials which can disperse and solubilize paint constituents in an aqueous medium. This invention also pertains to paint overspray treatment compositions which remain effective over prolonged periods of use on a variety of different paint formulations.

2. Discussion of the Relevant Art

Large quantities of paint of various kinds, including lacquers, varnishes, enamels, and certain specialty paints such as urethane-based paints, catalyzed two-component paints, base coat/clear coat combination paints, high solids enamels or lacquers, and the like, are used to coat finished products in industries such as automotive manufacture and the like. These paints, lacquers and varnishes are generally solvent-based; however, certain of these paints can be water-based. Some are considered low solids paints (i.e. materials containing about 20 to about 30% solids) while others are considered high solids paints (i.e. those containing above 50% solids).

These coatings or paint materials are generally sprayed onto the piece to be painted or coated in an enclosed area such as a paint spray booth. In this operation, substantial quantities of solvent and oversprayed paint are discharged into the spray booth and the air drawn therein. Paint spray booths provide a means for capturing and containing paint overspray components. The method of choice is to contain the solid overspray material components in a suitable liquid material.

Paint spray booths generally include a chamber, a duct system for passing air through the chamber, and a sump containing circulating liquid located in the bottom of the chamber which can be directionalized in the spray booth chamber to form a curtain of liquid to contact the oversprayed paint particles and volatile organic solvents and collect portions thereof. The paint spray booth also contains a gas discharge means such as a stack for discharging excess air or gaseous material. The paint spray booth is equipped with baffles or eliminators to reduce particulate carryout to acceptable levels such that most of the solids are retained in the paint spray booth washwater.

The liquid employed in paint spray booth applications is most preferably a hydrophilic material capable of removing solid particulates from the air. The liquid chosen is ideally economical and safe to use. The hydrophilic material of choice typically is comprised of water to which various chemicals are added to provide detackifying properties. Water-based compositions are also desirable for their general ease and safe handling during operation and during spray booth clean-up and maintenance. There are several drawbacks with such water-based systems. These include inconsistent paint kill and detackification, deposits on surfaces, accumulation of paint sludge, increased wet-sludge handling and disposal, and the weak performance of water-based systems as paint dispersants or solubilizers.

In contrast to water systems, various organic solvent systems have been proposed for use in paint spray booth applications; i.e. a solvent composition employing a solvent such as n-methyl pyrrolidone as disclosed in U.S. Pat. No. 5,019,138 to Farrah and U.S. Pat. No. 4,941,491 to Goerss. In solvent compositions, problems may be encountered during other operations in the paint spray booth employing water, such as routine cleaning maintenance and fire protection. In addition, the fluid properties of the solvent are likely to cause changes in the performance of the spray booth. Thus, paint spray booths may require modifications to successfully utilize solvent-based systems. It can be readily appreciated that such measures may be cumbersome and expensive.

Heretofore, one improvement has been to employ oil-in-water formulations in which water, oil and various additives are combined to form a suitable emulsion as the hydrophilic liquid of choice. The use of such oil-in-water emulsions is taught in U.S. Pat. Nos. 4,378,235, 4,396,405, 4,523,932, 4,563,199, 4,444,573, 4,544,026, 4,750,919, and 4,919,691, all of which are incorporated herein by reference.

Oil-in-water emulsions have been employed to contain greater volumes of paint solids than contained in water alone. However, the amount contained in such compositions is generally no greater than 4–6% by volume. There is no evidence to indicate that the oil-in-water emulsions currently in use dissolve or solubilize the paint which they contact. Thus, the capacity of the emulsion is limited to its dispersion capabilities and this is generally a function of the concentration of oil. In order to be effective, oil-in-water emulsions generally contain in excess of 25% by volume oil. In large capacity spray booths, this represents a significant material handling activity as well as increased operating expense.

These oil-in-water emulsions are generally weak alkaline emulsions which are easily broken. In order to maintain the material in an emulsified state, it is necessary to employ emulsion stabilizing additives, paying close attention to composition pH, and in many instances, requiring continued mechanical agitation.

Many of the patents previously enumerated provide various approaches for addressing some or all of the shortcomings inherent in oil-in-water emulsions. Of these, U.S. Pat. No. 4,919,691 to Patzelt et al has been one of the more effective. U.S. Pat. No. 4,919,691 to Patzelt et al discloses an oil-in-water emulsion which includes a process oil, a suitable oil-in-water emulsifier; and a non-polar organic solvent chosen from the group consisting of dialkyl esters of dibasic acids (DBE) such as dimethyl adipate, dimethyl glutarate, or dimethyl succinate in combination with water. Such additives were included in oil-in-water formulations to increase paint solids capacity in the emulsion and improved paint solids recovery. However, oil-in-water formulations containing DBE have significant drawbacks. DBE readily hydrolyses to form water-soluble products which are difficult to remove from water. The products of hydrolysis consume caustic, which thereby lowers the pH of the emulsion, thus jeopardizing its already poor stability. Thus, both caustic and DBE must be replenished to ensure emulsion stability and effectiveness. This fact, and the fact that DBE is non-recoverable from the spent material, represent significant drawbacks for any program utilizing oil-in-water formulations containing DBE.

Given the problems encountered with the various hydrophilic liquids currently available, there has been some incentive for manufacturers to switch to alternative technologies for paint spray containment and recovery. However, paint spray booths generally represent major items of capital investment so that wholesale replacement would be prohibitively expensive. Thus, it is highly desirable to develop a liquid composition which performs better and overcomes some of the drawbacks attributable to the circulating fluid in existing paint spray booth systems.

In Ser. No. 08/038,011 which is currently pending, the inventors proposed a paint overspray treatment composition which is composed of a carbonyl compound selected from the group consisting of secondary alcohol esters, condensation products of secondary alcohol esters and carboxylic acid and mixtures thereof in combination with a surfactant and water. In U.S. Pat. No. 5,200,104 which is the parent application of Ser. No. 08/038,011, the inventors proposed a paint overspray treatment composition which is composed of a carbonyl compound selected from the group consisting of secondary alcohol esters, condensation products of secondary alcohol esters and carboxylic acid, and mixtures thereof in combination with an emulsifier and water. In U.S. Pat. No. 5,198,143, the inventors proposed an enhanced paint overspray treatment composition which is composed of alcohol esters, condensation products of alcohol esters and carboxylic acid and mixtures thereof in combination with an emulsifier, a surfactant and water.

It was heretofore posited that the use of organic additives such as emulsifiers or surfactants was required to ensure emulsion stability or performance. This belief was due, in part, to knowledge derived from the performance of paint overspray treatment emulsions which contained materials other than secondary alcohol esters which were unable to interact effectively with contained paint. In such systems, use of surfactants, emulsifiers or combinations of the two were required to disperse or maintain the paint in the composition. Ongoing research into the particular chemistry of secondary alcohol esters and condensation products of secondary alcohol esters with carboxylic acid has lead to the unexpected discovery that such materials have heretofore unappreciated inherent properties for interacting with paint solids to render the paint dispersible in the composition.

The ability to provide an effective paint overspray treatment solution which does not require separate surfactant or emulsifier componcnts is highly desirable from a standpoint of cost savings and ease of use.

It would be desirable to provide a composition which has a greater capacity for containing paint either by solubilization, dispersion, or a combination of the two. It would also be desirable to provide a stable aqueous composition in which contained paint is maintained rather than settling out freely.

It is also desirable that the aqueous composition be made up of chemically stable components which retain their effectiveness in composition for a protracted period of time and which can be readily separated and recovered from the composition when required. It is also desirable that all components in the composition be economical and safe to handle and use. Finally, it is desirable that the composition employed require lower concentrations of active ingredients to achieve effective paint containment than previously obtainable and that the paint sludge thus contained be recoverable in a form which is easy to handle and process.

SUMMARY OF THE INVENTION

The present invention is a composition for treating oversprayed paints which consists essentially of:

a. an effective amount of an essentially non-volatile carbonyl compound selected from the group consisting of alcohol esters, condensation products of alcohol esters and carboxylic acid, and mixtures thereof, the carbonyl compound being capable of dissolving paint and remaining essentially insoluble and non-reactive in an aqueous media; and b. water.

The carbonyl compound employed in the composition of the present invention is selected from compounds having the general formulae:

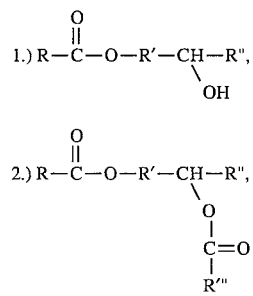

and mixtures thereof; wherein R' and R'' are chosen from the group consisting of substituted or unsubstituted linear alkyl groups having from 1 to 8 carbon atoms in the basic chain; and R and R''' are chosen from linear or branched alkyl groups having from 1 to 10 carbon atoms; R and R''' being either identical or different alkyl functionalities.

BRIEF DESCRIPTION OF THE PREFERRED EMBODIMENT

The composition of the present invention can be successfully employed in conventional paint spray booth applications as an effective, efficient substitute for conventional hydrophilic liquids such as water, organic solvents, or oil-in-water emulsions.

The present invention is predicated on the unexpected discovery that aqueous solutions containing a carbonyl compound selected from the group consisting of alcohol esters, condensation products of alcohol esters and carboxylic acid, and mixtures thereof can provide a suitably stable, mechanically induced paint overspray treatment emulsion in which essentially all of the organic components are recoverable and no appreciable quantity of organic material hydrolyzes into water soluble compounds.

The composition of the present invention consists essentially of:

a. generally between 5 and 50% by volume with between 5–30% being preferred, and between 12 and 18% by volume being most preferred, of a carbonyl compound selected from the group consisting of alcohol esters, condensation products of alcohol esters and carboxylic acid, and mixtures thereof capable of dissolving paint and remaining insoluble in an aqueous media; and
b. water.

The carbonyl compound employed in the composition of the present invention is a material capable of dissolving paint but which is insoluble in an aqueous media. The term "dissolving" as employed herein is defined as a process which encompasses both dispersal and passing into solution or solubilization of paint. The term "insoluble" is defined as having a solubility index of less than about 2 μg/liter.

The carbonyl compound employed in the present invention is selected from the group consisting of compounds having the general formulae:

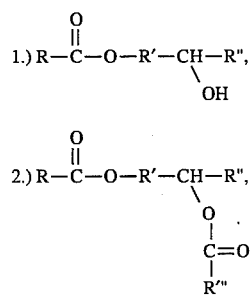

and mixtures thereof; wherein R' and R" are chosen from substituted and unsubstituted secondary alkyl groups having between 1 and 8 carbon atoms in the main chain; and R and R''' are chosen from linear or branched alkyl groups having between 1 and 10 carbon atoms wherein R and R''' may be either identical or different alkyl functionalities. In the preferred embodiment R' and R" are chosen from the group consisting of unsubstituted ethyl, propyl, butyl, pentyl, and hexyl, functionalities as well as the mono-, di- and tri-alkyl substituted derivatives thereof such as methyl propyl, methyl butyl, ethyl butyl, methyl propyl, dimethyl butyl, dimethyl pentyl, or trimethyl pentyl functionalities. R and R''' are chosen from the group consisting of propyl, isopropyl, butyl, isobutyl, or t-butyl functionalities.

The preferred hydrocarbon generally has physical characteristics within the parameters set forth in Table I with a hydrocarbon selected from the group consisting of 2,2,4-trimethyl-1,3-pentanediol monoisobutyrate, 2,2,4-trimethyl-1,3-pentanediol diisobutyrate, and mixtures thereof being preferred.

TABLE I

PHYSICAL CHARACTERISTICS OF HYDROCARBON

| | |
|---|---|
| Boiling Point | 200° to 300° C. |
| Specific gravity (20° C.) | 0.94 to 0.955 |
| Water solubility | Insoluble |
| Viscosity (20° C.) | 8 to 14 cP |
| Vapor Pressure | <0.01 mm Hg (at 20° C. and 1 atom) |

In the composition of the present invention, the carbonyl compound is present from about 5 to about 50 percent by volume based on the total composition weight with the remainder being water. In actual usage, the alcohol ester of the present invention comprises between about 5 and about 30% by volume with amounts between about 12% and about 18% by volume being preferred.

Without being bound to any theory, it is believed that the alcohol esters defined in the present invention exhibit qualities which permit the material both to maintain paint overspray in the treatment solution and to create a composition which exhibits the behavior of an emulsion or a pseudo-emulsion. It is also theorized that the carbonyl component of the composition may function synergistically with the surfactant component to yield an emulsion or emulsion-like material with sufficient stability to be maintainable in an environment where it is exposed to minor amounts of mechanical agitation such as would be exerted on the composition through paint spray booth recirculation systems.

The dispersion or emulsion-like state of the composition of the present invention can be readily formed by mechanical agitation and unexpectedly permits easy breakage of the emulsion into its hydrophilic and hydrophobic component parts when loaded with paint solids upon acidication to a pH below about 6, with a pH below about 4.0 being preferred.

The emulsified state of the composition is best maintained at an alkaline pH range between about 7.5 and 12.0 with a range between 7.5 and 9.0 being preferred. The composition of the present invention may contain a suitable basic compound in sufficient concentration to provide a pH in the desired range. Suitable basic compounds are preferably alkali metal hydroxides with materials selected from the group consisting of sodium hydroxide, potassium hydroxide, and mixtures thereof being preferred.

In the preferred embodiment, the composition of the present invention contains between about 15% and about 18% of a carbonyl compound selected from the group consisting of 2,2,4-trimethyl-1,1,3-pentanediol monoisobutyrate, 2,2,4-trimethyl-1,1,3-pentanedioldiisobutyrate, and mixtures thereof; and water. The material is maintained at a pH between about 7.5 and about 12, with a pH between about 7.5 and about 9.0 being preferred.

In order to further illustrate the composition of the present invention, the following Examples are submitted. It is submitted that these examples are for illustrative purposes only and are not to be construed as limitations of or on the present invention.

FORMULATIONS 1–6A

In order to compare the effectiveness of overspray treatment compositions containing secondary alcohol esters, and/or condensation products of secondary alcohol esters with conventional non-alcohol formulations, six test emulsions were prepared. Formulation 1 was a conventional oil-in-water emulsion in which the organic (oil and oleic acid) phase constituted 30% by volume of the initial emulsion. Formulations 2 and 4 were modified oil-in-water emulsions containing dialkyl dibasic acids (DBE) as outlined in U.S. Pat. No. 4,919,691 to Patzelt at concentrations of 6% by volume and 12% by volume respectively. The total organic content of Formulation 2 was 30% by volume and in Formulation 4, it was 23% by volume. In Formulation 3, the DBE in Formulation 2 was substituted with diisobutyl esters (DIB). The total initial organic content of this Formulation was 30% by volume.

Formulations 5 and 6 were prepared according to the disclosure of U.S. Ser. No. 07/790,650 which is incorporated herein by reference to contain 2,2,4-trimethyl-1,3-pentanediol monoisbutyrate (2,2,4 MONO) and 2,2,4-trimethyl-1,3-pentanediol diisobutyrate (2,2,4 DIISO), respectively, in the proportions outlined in Table III, the total initial organic content of these Formulations was 18% by volume.

Formulations 5A and 6A were prepared according to the disclosure of U.S. Ser. No. 07/861,091 which is incorporated herein by reference. Formulation 5A contained 2,2,4-trimethyl-1,3 pentanediol monoisobutyrate and an oleic acid emulsifier in the amount outlined in Table IIIA. Formulation 6A was prepared to contain 2,2,4 MONO, oleic acid and the surfactant nonylphenoxypolyoxyethylene ethanol (NONOXYNOL-4) in the amount outlined. The total initial organic content of these formulations was 18 and 21% by volume respectively.

The pH of each Formulation was measured and is recorded in Tables III and IIIA, respectively.

EXAMPLES 1–5, 5A and 6A

In order to ascertain the relative stability of the various formulations, Formulations 1–5 were agitated at high speed for approximately 1 minute and allowed to sit undisturbed for at least seven days. The formulations were agitated 15 minutes prior to sampling. Aqueous, organic, and solid concentrations were determined by acidifying and centrifuging an aliquot of the formulation. The mass balance was calculated and the data is presented in Table IV.

As shown in Table IV, formulations containing DBE show a decrease in final organic mass indicating the loss of a portion of the organic phase in the aqueous phase due to hydrolysis. No appreciable hydrolysis was detected in the oil/DIB-in water sample or in the formulations 5, 5A or 6A.

EXAMPLES 6–37

Actual effectiveness of the various formulations in treating oversprayed paint was determined by admixing a predetermined amount of a commercially available automotive paint with the given formulation and agitating at high speed for one minute. In all, four commercially available paint formulations were employed with the formulations outlined in Tables III and IIIA: MFGR "A" Clear Coat, MFGR "B" Base Coat, MFGR "A" Prime, and MFGR "C" Base Coat. These paint formulations are proprietary materials commercially available from various companies. The procedures employed in testing were those outlined previously in Examples 1–5, 5A and 6A. The data were collected and are set forth in Table V.

In the formulations prepared according to the present invention, the paint solids did not separate from the oil phase in all cases. Therefore, a mass balance of the sum of the organic and solid phases was determined. This data is also presented in Table V. The mass balance of the formulations of the present invention are significantly greater, in all of the examples cited, than the mass balance of the conventional formulations.

From the foregoing, it can be concluded that treatment compositions containing secondary alcohol esteric materials such as 2,2,4-trimethyl-1,3-pentanediol, monoisobutyrate or 2,2,4 trimethyl-1,3-pentanediol diisobutyrate provide enhanced paint solids containment at lower total organic concentrations with better organic and solids recovery than conventional overspray treatment compositions.

EXAMPLES 38–41

Paint overspray treatment compositions such as those outlined in Formulations 5, 6, 5A and 6A are employed in paint spray booths under conventional operating conditions for an operating period of 10 days. Make up volumes water and treatment solution are added as necessary.

At the end of the 10 day internal a marked increase in foaming is noted in each composition. It is hypothesized that continued increase in foaming could interfere with the optimum paint containment characteristics of the material and function of the paint spray booth. Samples of each Formulation are removed for analysis. Analysis of each sample indicates the pressure of sodium oleate in amounts equal to or exceeding 12% of the total initial concentration of oleic acid.

EXAMPLES 42–43

Paint overspray treatment compositions are prepared according to the disclosure of Ser. No. 8/038,011 filed Mar. 29, 1993 containing 2,2,4 MONO and 2,2,4 DIISO respectively together with the surfactant nonylphenoxypolyoxyethylene ethanol (NONOXYNOL-4) in the proportions outlined in Table VI. The pH of each Formulation is outlined in Table VI.

The total initial organic content for these formulations is 18% by volume.

In order to ascertain the relative stability of the formulations, Formulations 7 and 8 are agitated at high speed for approximately 1 minute and is allowed to sit undisturbed for at least seven days. The formulations are agitated 15 minutes prior to sampling. Aqueous, organic and solid concentrations are determined by acidifying and centrifuging an aliquot of the formulation. The mass balance which can be calculated from this data will indicate that no appreciable hydrolysis will be detected in the formulations.

EXAMPLES 44–45

Paint overspray treatment compositions are prepared according to the disclosure of the present invention containing 2,2,4 MONO and 2,2,4 DIISO respectively in the proportions outlined in Table VII. These formulations were designated as formulations 9 and 10. The pH of each formulation is outlined in Table VII.

EXAMPLES 46–47

Samples of Formulations 5A, 6A, 7, 8, 9 and 10 are agitated to emulsify the organic material in the aqueous solution. The stability and dispersability of the emulsion relative to formulations 5A and 6A are observed. Heretofore it was believed that formulations which lacked both the oleic acid emulsifier and the surfactant would fail to form adequate emulsions. However, contrary to that prediction, Formulations 9 and 10 which exhibit sufficient emulsion-like characteristics to permit their use as paint overspray treatment compositions.

Without being bound to any theory, it is believed that this characteristic is due, at least in part, to unexpected heretofore unappreciated emulsification and dispersal properties of the alcohol esteric compounds employed in the present invention when the composition is subjected to mechanical emulsification.

EXAMPLES 48–51

The ability of paint overspray treatment compositions to contain paint solids is investigated by loading material prepared according to formulation 9 with paint to a total initial paint concentration of 10% by volume. Various commercially available paint formulations are employed: MFGR "A" Clear Coat, MFGR "B" Base Coat, MFGR "A" Prime and MFGR "C" Base Coat. The paint formulations are proprietary materials commercially available from various companies as indicated previously in Examples 6–37.

The composition of the present invention is able to contain paint in the concentration indicated in an emulsified manner with minimal mixing and can be broken by acidification of the composition to a level below 5.5 to yield an easily separable paint solid component.

Having thus described the composition of the present invention, what is claimed is:

1. A composition for treating oversprayed paints consisting essentially of:

between about 5 and about 50 percent by volume of carbonyl compound selected from the group consisting of alcohol esters, condensation products of alcohol esters and carboxylic acids, and mixtures thereof, said carbonyl compound being capable of dissolving paint while remaining essentially insoluble and non-reactive with an aqueous media; and water.

2. The composition of claim 1 wherein said carbonyl compound is selected from the group consisting of

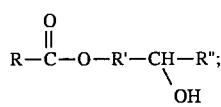

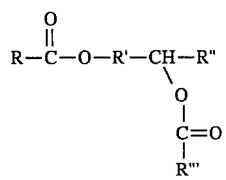

and mixtures thereof, wherein R' and R" are chosen from the group consisting of substituted alkyl groups, substituted alkyl groups and mixtures thereof, said substituted and unsubstituted alkyl groups having from 1 to 8 carbon atoms, wherein R and R''' are chosen from the group consisting of linear alkyl groups having from 1 to 10 carbon atoms, branched alkyl groups having from 1 to 10 carbon atoms, R and R''' being either identical or different alkyl functionalities.

3. The composition of claim 2 wherein said carbonyl compound is selected from the group consisting of secondary alcohol esters, condensation products of secondary alcohol esters and carboxylic acid, and mixtures thereof.

4. The composition of claim 2 wherein said carbonyl compound is selected from the group consisting of secondary propanol esters, condensation products of secondary propanol esters and carboxylic acid, secondary butanol esters, condensation products of secondary butanol esters and carboxylic acid, secondary pentanol esters, condensation products of secondary pentanol esters and carboxylic acid, and mixtures thereof.

5. The composition of claim 1 wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof.

6. The composition of claim 2 further comprising an alkaline agent present in an amount sufficient to impart a composition pH above about 7.5, said alkaline agent selected from the group consisting of sodium hydroxide, potassium hydroxide and mixtures thereof.

7. The composition of claim 6 wherein said carbonyl compound is present in an amount between about 5 and about 30% by volume.

8. The composition of claim 7 wherein said carbonyl compound is present in an amount less than 20% by total composition volume.

9. The composition of claim 8 wherein said carbonyl compound is present in an amount between about 12% and about 18% by total composition volume.

10. The composition of claim 8 wherein water is present in an amount greater than 75% by total composition volume.

11. A composition for treating oversprayed paints consisting essentially of:

from about 10 to about 25% by volume of a carbonyl compound having a vapor pressure less than 0.1 mm Hg selected from the group consisting of secondary alcohol esters, condensation products of secondary alcohol esters and carboxylic acid, and mixtures thereof, said carbonyl compound being capable of dissolving paint contained therein, said carbonyl compound being insoluble and non-reactive in an aqueous media;

a basic compound selected from the group consisting of potassium hydroxide, sodium hydroxide and mixtures thereof present in an amount sufficient to provide a pH between about 7.5 and about 12.0; and water.

12. The composition of claim 11 wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof.

13. The composition of claim 12 wherein said carbonyl compound is present in an amount between about 12% and about 18% by total composition volume.

14. A composition for treating oversprayed paints consisting essentially of:

between about 12% and 18% by volume of a hydrocarbon selected from the group consisting of 2,2,4-trimethyl-1,3-pentanediol monoisobutyrate, 2,2,4-trimethyl-1,3-pentanediol diisobutyrate, and mixtures thereof;

a basic compound selected from the group consisting of sodium hydroxide, potassium hydroxide nd mixtures thereof present in an amount sufficient to provide a pH betwen about 7.5 and about 9/0; and water.

* * * * *

UNITED STATES PATENT AND TRADEMARK OFFICE
CERTIFICATE OF CORRECTION

PATENT NO. : 5,464,556
DATED : November 7, 1995
INVENTOR(S) : Edwin C. Zuerner, et al.

It is certified that error appears in the above-identified patent and that said Letters Patent is hereby corrected as shown below:

On the title page item [75], delete "Ratzelt" and insert --Patzelt--.

Signed and Sealed this

Second Day of March, 1999

Attest:

Q. TODD DICKINSON

*Attesting Officer*   *Acting Commissioner of Patents and Trademarks*